US007366833B2

(12) United States Patent
Chanda et al.

(10) Patent No.: US 7,366,833 B2
(45) Date of Patent: Apr. 29, 2008

(54) METHOD AND SYSTEM FOR ENHANCED SCHEDULING OF MEMORY ACCESS REQUESTS

(75) Inventors: Anupam Chanda, Houston, TX (US); Ramakrishnan Rajamony, Austin, TX (US); Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 10/334,279

(22) Filed: Dec. 31, 2002

(65) Prior Publication Data

US 2004/0128459 A1 Jul. 1, 2004

(51) Int. Cl.
G06F 12/00 (2006.01)
(52) U.S. Cl. .......................... 711/112; 711/158; 710/6; 710/40; 710/43
(58) Field of Classification Search ................ 711/112, 711/158; 710/6, 40, 43
See application file for complete search history.

(56) References Cited

U.S. PATENT DOCUMENTS 5,787,482 A * 7/1998 Chen et al. ................. 711/158
6,434,631 B1 8/2002 Bruno et al.

OTHER PUBLICATIONS

Gopalan, Real-Time Disk Scheduling Using Deadline Sensitive SCAN, Jan. 2001, Computer Science Department, State University of New York at Stony Brook, pp. 1-6.*

Reddy and Wylie, Disk Scheduling in Multimedia I/O System, Aug. 1993, Proceedings of ACM Multimedia'93, pp. 225-234.*

Kartik Gopalan, *Real-Time Disk Scheduling Using Deadline Sensitive SCAN*, Computer Science Department, State University of New York at Stony Park, Stony Brook, New York 11794-4400.

Christopher R. Lumb, *Towards Higher Disk Head Utilization: Exstracting Free Bandwidth from Busy Disk Drives*, Proceedings of the 4th Symposium on Operating Systems Design and Implementation (OSDJ), Oct. 2000.

* cited by examiner

*Primary Examiner*—Donald Sparks
*Assistant Examiner*—Matthew Bradley
(74) *Attorney, Agent, or Firm*—Casimer K. Salys; Dillon & Yudell LLP

(57) ABSTRACT

In information storage systems in which data retrieval requires movement of at least one physical element, a measurable amount of time is required to reposition that physical element in response to each data write or read request. After selecting one or more data requests for dispatch based solely on an approaching or past due time deadline, additional requests are identified for data to be read or written to locations which are in close proximity to previously scheduled requests, previously selected additional requests, or the present position of the moveable physical element, obviating the need to expend the full amount of time required to accelerate the physical element and then decelerate the physical element to position it over the desired area within the information storage system. In this manner, data may be transferred to or retrieved from an information storage system more efficiently with less expenditure of time.

3 Claims, 5 Drawing Sheets

METHOD AND SYSTEM FOR ENHANCED SCHEDULING OF MEMORY ACCESS REQUESTS

BACKGROUND OF THE INVENTION

1. Technical Field

The present invention relates in general to improved information storage systems, and in particular to a method and system for enhanced scheduling of read or write requests to an information storage system.

2. Description of the Related Art

Modern computer applications require large amounts of data. In many applications, this data must be retrieved from an information storage system, such as a computer disk drive system. Such disk drive systems increasingly limit performance in many computer systems, creating complexity and performance bottlenecks. It is typically the mechanical nature of computer disk drives, tape systems and other information storage systems, which fails to track the performance enhancements of modern day computer systems, as a result of the mechanical positioning aspects of such systems.

Consequently, modern computer system applications, typically utilizing a moving-head disk drive, have begun to attempt to schedule requests from the information storage system in a manner which minimizes the impact of these storage systems on the computer system performance.

A number of disk scheduling algorithms are discussed in the literature and utilized in modern commercial systems. These disk scheduling algorithms typically fall into two categories: Non-Real-Time algorithms and Real-Time algorithms.

Non-Real-Time algorithms do not take into account any time constraint associated with a request from a data storage system. A simple example of such a system is the so-called First-Come-First-Serve (FCFS) algorithm utilized in early systems which do not experience large amounts of input/output traffic.

A SCAN algorithm, also known as the "elevator" algorithm, moves the mechanical arm in an information storage system in one direction and services all requests which lie in that direction until no requests are remaining. The mechanical arm then changes its SCAN direction and repeats the operation, servicing all requests which can be served in the other direction. This algorithm has the advantage of reducing disk seek times; however, if a request arrives for data at one end of a disk and the arm has recently passed that section of the disk, a long wait time will result.

Circular SCAN (C-SCAN) is a variation of a SCAN algorithm in which the mechanical arm always scans in the same direction. Thus, after serving the last request in the SCAN direction, the arm returns to a start position without servicing any requests and begins scanning in that direction again. This algorithm provides a more uniform wait time for input/output requests.

The Shortest-Seek-Time-First (SSTF) algorithm selects the requests which will require the minimum seek time from the current arm position. Since seek-time is proportional to the number of tracks which the arm crosses, this algorithm is implemented by moving the head to the closest track in the request queue. While this algorithm might seem to reduce overall seek-time of all requests, it periodically suffers from the starvation problem for those requests which are furthest away from the current arm position.

The Shortest-Positioning-Time-First (SPTF) algorithm selects the requests with the shortest input/output time, including both seek and rotational latency. This algorithm typically includes two variations, the grouped variation or the weighted variation. These variations were proposed to solve the starvation problem associated with the original Shortest-Time-First algorithm. They are typically applied in an environment where the input/output queue length is assumed to be very long.

Finally, a Group Sweeping Scheme (GSS) permits many requests to be serviced in a service round by partitioning the requests into groups where each group is served in a fixed order within the round. The SCAN algorithm is applied within each group and the number or groups or the group size may be tuned to achieve a better performance. Each of these Non-Real-Time algorithms is fully described in the literature.

Real-Time algorithms have been proposed for scheduling information storage system accesses to achieve Real-Time retrieval. These algorithms take into account time constraints which are associated with particular input/output requests for service.

Among the Real-Time algorithms is Earliest-Deadline-First (EDF) which is an algorithm originally designed for processor scheduling. When applied to disk, the algorithm simply selects the request with the earliest deadline for service. An advantage of this algorithm is that is simple to implement; however, a weakness of this algorithm is that the algorithm does not consider the arm position to perform any seek optimization. Consequently, the disk system spends a substantial portion of time seeking, resulting in reduced throughput.

A variation of this technique is the Feasible-Deadline-SCAN (FD-SCAN) algorithm which is proposed for a real-time transaction processing and in which the track location of the request with earliest feasible deadline is utilized to determine the SCAN direction. A deadline is considered "feasible" if that deadline can be met. At each scheduling point in such an algorithm, all requests are examined to determine which has the earliest feasible deadline.

More recently, an algorithm known as "Deadline Sensitive SCAN" (DS-SCAN) has been proposed as a hybrid of the traditional EDF and SCAN algorithms. The main feature of this algorithm is that, whenever possible, it closely imitates that behavior of the SCAN algorithm in order to increase the effect of throughput of a disk, subject to the constraints, that deadline Real-Time requirements are not missed.

Upon review of the art, those skilled in this area will appreciate that the efficiency of scheduling input/output operations to an information storage system continues to be a limiting factor in computer performance.

SUMMARY OF THE INVENTION

It is therefore one object of the present invention to provide an improved information storage system.

It is another object of the present invention to provide an improved method and system for scheduling read or write requests to an information storage system.

The forgoing objects are achieved as is now described. In information storage systems in which data retrieval requires movement of at least one physical element, a measurable amount of time is required to reposition that physical element in response to each data write or read request. After selecting one or more data requests for dispatch based solely on an approaching or past due time deadline, additional requests are identified for data to be read or written to locations which are in close proximity to previously scheduled requests, previously selected additional requests, or the present position of the moveable physical element, obviating the need to expend the full amount of time required to accelerate the physical element and then decelerate the physical element to position it over the desired area within the information storage system. In this manner, data may be transferred to or retrieved from an information storage system more efficiently with less expenditure of time.

BRIEF DESCRIPTION OF THE DRAWINGS

The novel features believed characteristic of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

Figure 1:
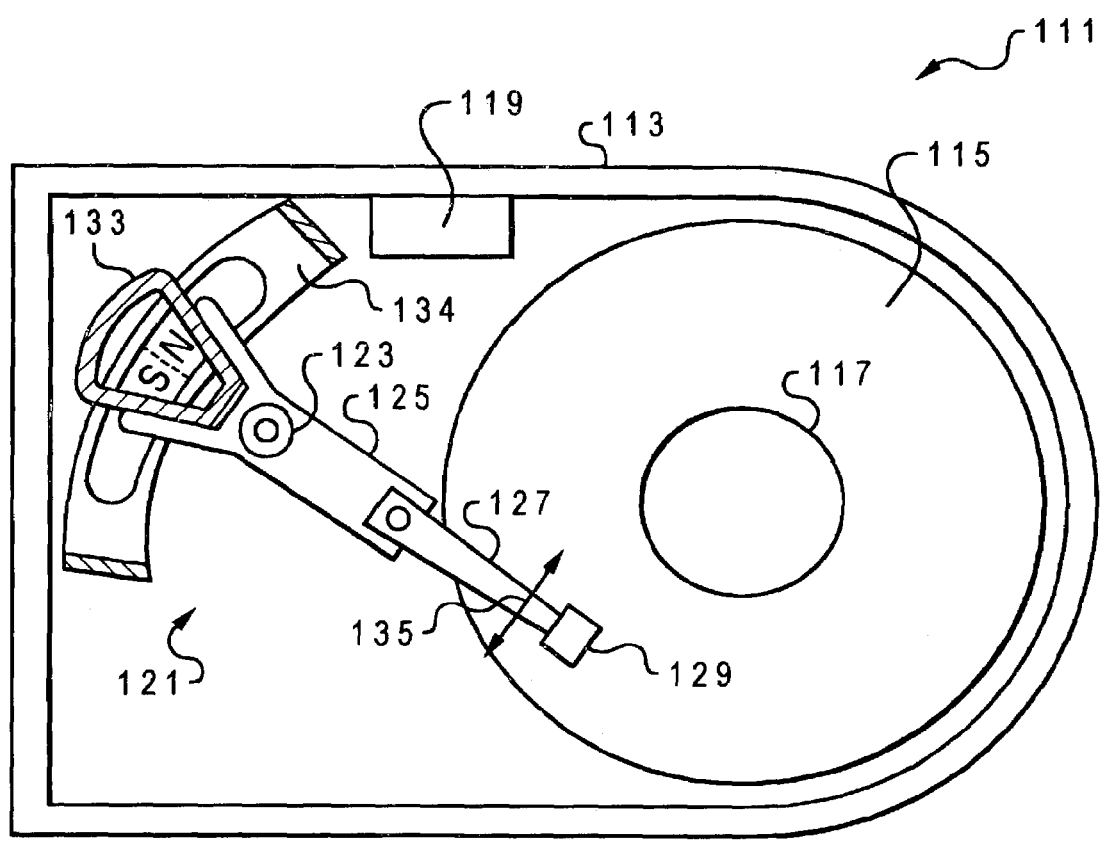
FIG. 1 is a schematic drawing of an information storage system which may be utilized with the method and system of the present invention.

With reference now to the figures and in particular with reference to FIG. 1, there is depicted a schematic drawing of an information storage system comprising a magnetic hard disk file or drive 111 for a computer system. While a magnetic hard disk file 111 is depicted in the present figure, those having ordinary skill in the art will appreciate, upon reference to the present specification, that the method and system of the present invention will find equal application in any information storage system which includes a mechanical element which must be adjusted for data retrieval or writing.

Magnetic hard disk file 111 includes an outer housing or base 113 which typically contains a plurality of stacked, parallel magnetic disks 115 (one shown), which are mounted in a closely spaced apart fashion. Each disk 115 is mounted to a shaft which is rotated by a spindle motor assembly having a central drive hub 117. An actuator 121 comprises a plurality of parallel actuator arms 125 (one of which is shown), in the form of a comb that is pivotally mounted to base 113 about a pivot assembly 123. A controller 119 is also mounted to base 113 for selectively moving the comb of arms 125 relative to disk 115.

In the embodiment depicted within this figure, each arm 125 has extending therefrom at least one cantilevered load beam or suspension 127. A magnetic read/write transducer or head 129 is mounted on a slider and secured to a flexure that is flexibly mounted to each suspension 127. The read/write heads 129 magnetically read data from and/or magnetically write data to disks 115. The level of integration call the "head gimbal assembly" is head 129 and the slider, which are mounted on suspension 127. The slider is typically bounded to one end of suspension 127. Head 129 is typically pico size (approximately 1250×1000×300 microns) and formed from ceramic or inter-metallic materials. Head 129 may also be nano sized (approximately 1250×1600×450 microns) and is typically pre-loaded against the surface of disk 115 (in the range of two to ten grams) by suspension 127.

Each suspension 127 exhibits a spring-like quality which biases or urges the slider air bearing surface against the disk to enable the creation of the air bearing film between the slider and disk surface. A voice coil 133 housed within a conventional voice coil motor magnetic assembly 134 (the top pole of which is not shown), is also mounted to arms 125 opposite the head gimbal assemblies. Movement of the actuator 121 (indicated by arrow 135) by controller 119 moves head gimbal assemblies 129 radially across the tracks of disk 115 until the heads 129 settle on the target track. The head gimbal assemblies operate in a conventional manner and always move in unison with one another, unless drive 111 utilizes multiple independent actuators (not shown) when the arms can move independently of one another.

In such systems, data is stored within various arc segments of each track and each track and its corresponding tracks on the remaining disks 115 are typically referred to as "cylinders." Modern hard disk files may include thousands of such cylinders and store many gigabytes of data.

Figure 2:
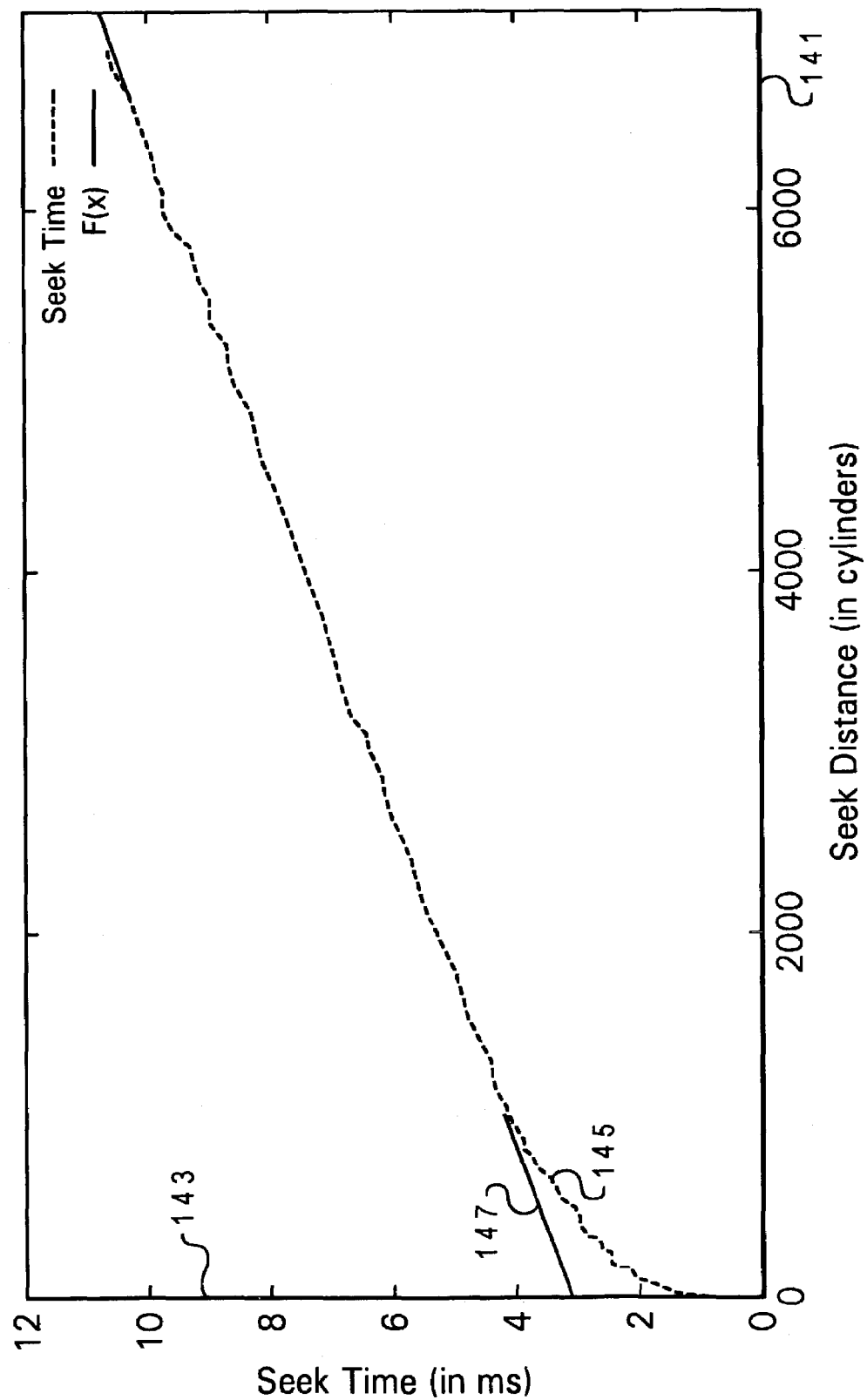
FIG. 2 is a graphic depiction of an observed correlation between seek distance and seek time in an information storage system.

Referring now to FIG. 2, there is depicted a graph which illustrates an observed correlation between seek distance and seek time in such an information storage system. As illustrated, the graph includes a horizontal axis 141, which corresponds to the seek distance, expressed in the number of cylinders, between an initial point and the point to which the head 129 must be moved. The vertical axis 143 represents the seek time in milliseconds which is required to move head 129 from an initial position to a position which is a selected distance away from the present position, expressed in cylinders.

Still referring to FIG. 2, curve 145 represents the correlation between seek time and seek distance. As depicted, curve 145 is not linear throughout its entire range. As illustrated, an asymptote 147 is depicted and, in accordance with an important feature of the present invention, seek operations between two locations which are closely proximate to one another take a time which is measurably below the anticipated seek time predicted by a linear model for such operations. This is a phenomenon that is well-known to those skilled in the art. It is discussed in the literature in articles such as "*An Introduction to Disk Drive Modeling*" by Chris Ruemmler and John Wikes, IEEE Computer, 27(3):17-28, 1994.

This non-linearity occurs as a result of the inertia which must be overcome in such systems when accelerating head 129 from a current position to a desired position. As those skilled in this art will appreciate, instantaneous acceleration is not possible and, consequently, the amount of seek time required to reposition the head to a closely proximate location is substantially less than the amount of time which might otherwise be predicted.

Figure 3:
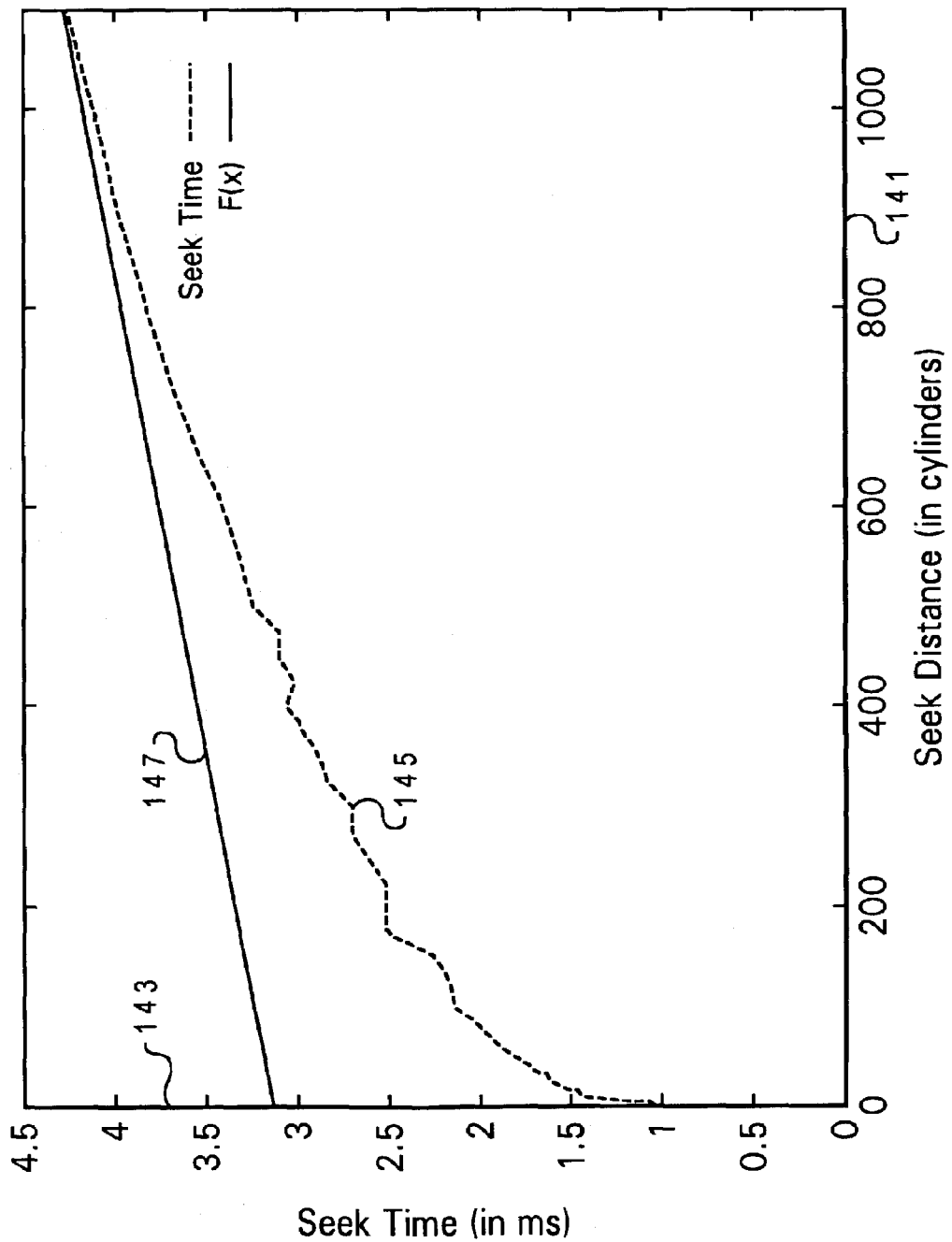
FIG. 3 is an enlarged portion of the graph of FIG. 2.

Referring now to FIG. 3, an enlarged depiction of a portion of a graph of FIG. 2 is illustrated. Once again, seek distance is expressed along the horizontal axis 141 and seek time is depicted along the vertical axis 143. As illustrated, a substantial decrease in seek time is noted between the observed curve 145 and the asymptote 147 which accurately describes the remainder of the observed phenomenon. Thus, it would seem that a seek distance from a given location, in the present example, of less than one thousand (1000)

cylinders can be accomplished much more rapidly than would be expected from the time taken to seek large distances.

Figure 4:
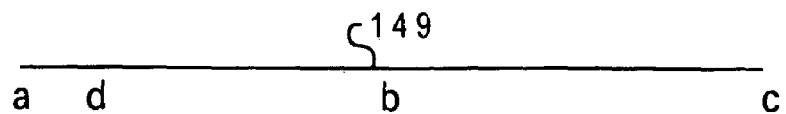
FIG. 4 is a schematic representation of four (4) data location points within an information storage system.

This phenomenon leads to the observation depicted within FIG. 4, which illustrates a schematic representation of four data location addresses in an information storage system. As illustrated, data points a, d, b and c are depicted along line 149, with their positions being indicative of the cylinders on which the data is stored. Additionally, the distance from a to d in cylinders is less than the cylinder distance at which the asymptote 147 meets curve 145, while all other distances are greater than that distance. Then, in accordance with the phenomenon illustrated within FIG. 3 above, the amount of seek time required to traverse from point a to point d and then from point d to point c is less than the seek time required to traverse from point a to point b and then to point c.

Figure 5:
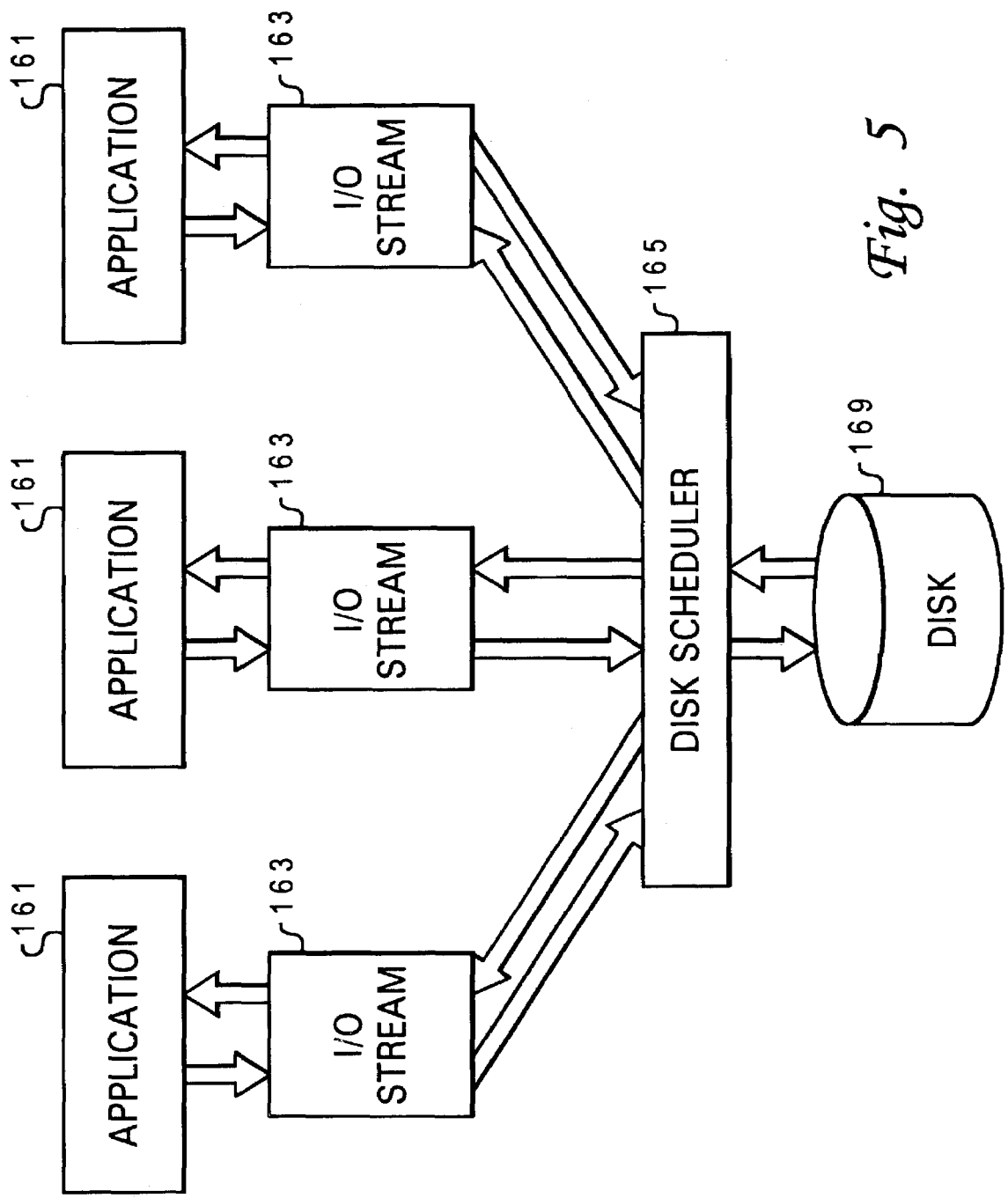
FIG. 5 is a high level block diagram of a system for implementing the method and system of the present invention.

With reference now to FIG. 5, there is depicted a high level block diagram of a system which implements the method and system of the present invention and takes advantage of the above-described non-linear aspect of near location seeks. As illustrated, a group of applications 161 serve as the source for a plurality of information storage system access requests. That is, requests to read data from or write data to an information storage system. These requests are each coupled to an input/output stream 163 and then to disk scheduler 165. In accordance with an important feature of the present invention, disk scheduler 165 implements the process described in the present application and thereafter dispatches requests to disk 169.

Figure 6:
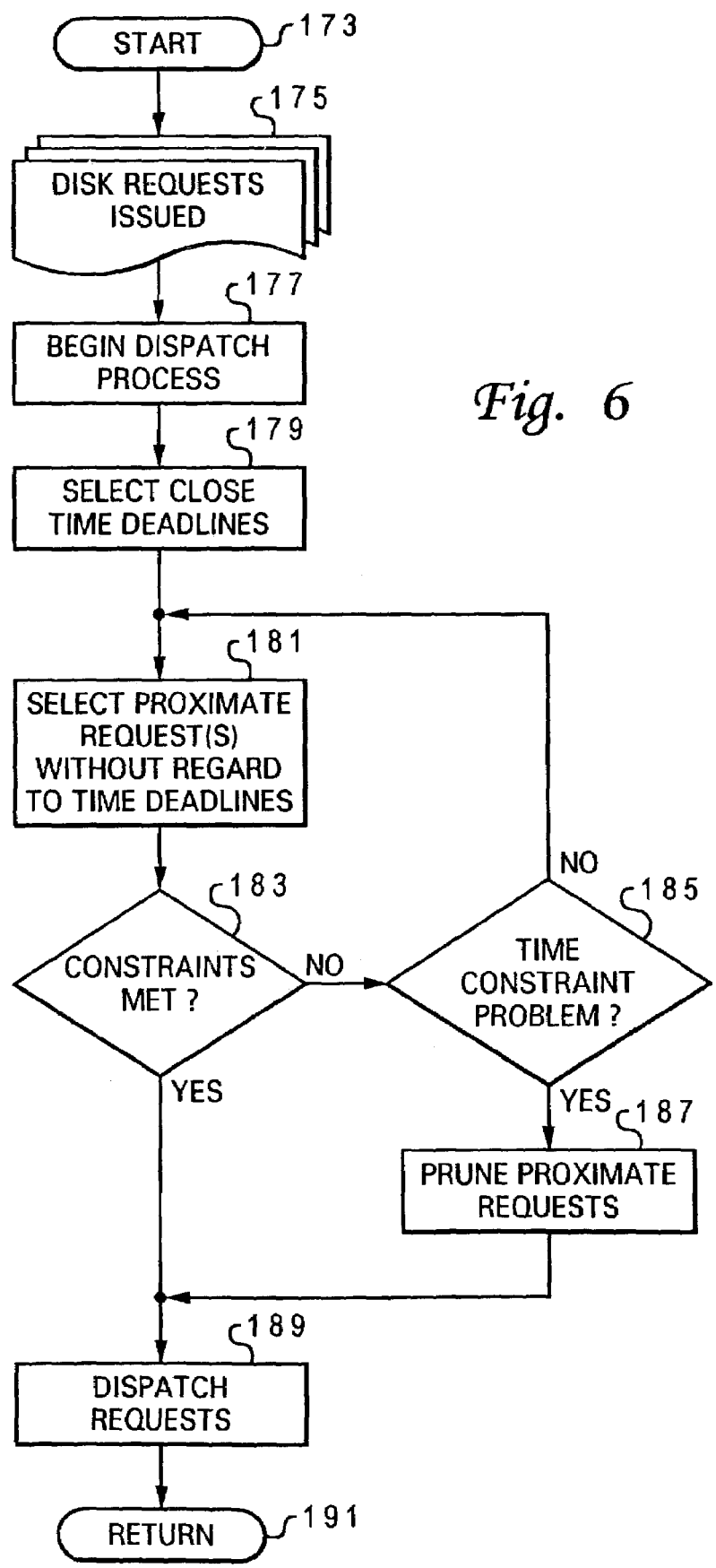
FIG. 6 is a high level logic flow chart illustrating a process for implementing one embodiment of the present invention.

Finally, referring to FIG. 6, there is depicted a high level logic flow chart which illustrates the process carried out by disk scheduler 165 (see FIG. 5) in dispatching disk requests to disk 169. As illustrated, this process begins at 173 and thereafter passes to block 175, which depicts the issuance of disk or information storage system access requests by the various applications 161.

Thereafter, periodically, the dispatch process begins as depicted at block 177. As those having ordinary skills in the art will appreciate, certain requests of the information storage system may have associated therewith various time deadlines when retrieval of the data or writing of the data must occur within a specified time period in order to satisfy a system requirement. Furthermore, in situations where the applications do not associate explicit deadlines with requests, another agent, such as an operating system, may associate deadlines on behalf of the applications. For example, such deadlines may be applied based upon pre-established rules, such that once a request is issued, that request must be serviced within a pre-specified time limit. As those having skill in the art will appreciate, such rules can be customized for each request, based upon the type of application originating that request (i.e., interactive, background, data intensive, etc.).

The dispatch process is initiated in block 179 which illustrates the selection of one or more requests for access to the information storage system which include close time deadlines, that is, requests which much be served by a specified near time in order to meet the requirements of the application or operating system.

Next, as depicted in block 181, in accordance with an important feature of the present invention, certain proximate requests are selected without regard to any time deadline associated therewith, where those requests are located in close proximity to previously selected requests, or the current position of the disk head.

As those skilled in the art will appreciate, information storage systems such as disk drives or the like, typically include addresses at which data may be stored and the term "close proximity," as utilized within the present application, is intended to describe a data request for the information storage system which may be satisfied by reading or writing the data to a location which falls within sufficient proximity to a current position of the disk head, or a data request which is mandated by a time deadline so as to fall within the non-linear portion of the seek distance/seek time curve described above. Of course, as the storage density of such information storage systems increases, the number of "cylinders" or other distance measurements which fall under this non-linear portion of the seek-distance/seek-time curve will also increase. The one thousand cylinder example set forth in the present specification is just intended as a current benchmark under existing storage densities.

Next, the time deadline constraint requests and the proximate requests are considered, as illustrated in block 183, to determine whether or not the constraints for dispatch have been met. Such constraints may include the satisfying of all time deadlines, the dispatching of a number of requests which will take full advantage of buffer sizes, or other constraints.

If the constraints are not met, the process passes to block 185, which depicts a determination of whether or not the failure to meet constraints is a time constraint problem, that is, requests with selected time deadlines which will not be met. If time constraint problems are not the reason constraints could not be met, the process returns, in an iterative fashion, to block 181 which depicts the selection of additional proximate requests, without regard to any time deadline associated therewith. These additional proximate requests may be either proximate to the originally selected time deadline driven requests, proximate to the previously selected time deadline driven requests or proximate to other, previously added non-deadline-driven requests, or proximate to the current position of the disk head, so long as the distance between the previously selected requests and the current disk head position, or the current request is sufficiently small so as to take advantage of the non-linear seek portion of the seek distance/seek time curve described above.

Next, as described above, the process passes again to block 183, which once again illustrates a determination of whether or not the constraints for dispatch have been met. Still referring to block 183, in the event the dispatch constraints have been met, the process passes to block 189, which depicts the dispatching of those requests and the process then passes to block 191 and returns.

Referring again to block 185, if the constraints are not met as a result of a time problem, the process passes to block 187, which illustrates the pruning or deselection of previously selected proximate requests. Of course, the selection of additional requests or the deselection of such requests may be mandated by additional criteria set by the operating system. For example, certain applications may be limited in the amount of memory permitted for buffering early selected memory requests. The process then passes to block 189, which depicts the dispatching of the remaining requests and then passes to block 191 and returns.

As those skilled in the art will appreciate upon reference to the foregoing description, by selectively identifying data requests for an information storage system which lie in close proximity to requests which are mandated by sensitive time deadlines, the efficiency of the system may be greatly enhanced by reducing the seek time required for the amount of data retrieved.

While the invention has been particularly shown and described with reference to a preferred embodiment, it will be understood by those skilled in the art that various changes in form and detail may be made therein without departing from the spirit and scope of the invention.

What is claimed is:

1. A method for enhanced scheduling of a plurality of information storage system access requests, each of said plurality of information storage system access requests having an associated storage system address, said method comprising the steps of:

associating a time deadline with selected ones of said plurality of information storage system access requests;

periodically selecting one or more of said plurality of information storage system access requests for execution based solely upon an associated time deadline;

determining if said associated time deadline for said one or more of said plurality of information storage system access requests can be met while executing at least one additional information storage system access request and said selected one or more of said plurality of information storage system access requests; and selecting at least one additional information storage system access request for execution without regard to it's associated time deadline based solely upon close proximity between an information storage system address of said at least one additional information storage system access request and either an information storage system address of said selected one or more of said plurality of information storage system access requests, or a current information storage system address, if said associated time deadline can be met.

2. The method according to claim 1, wherein said information storage system is a disk storage system having data stored therein in concentric cylinders and wherein said selected at least one additional information storage system access request comprises a request having an address within one thousand cylinders of said selected one or more of said plurality of information storage system access requests.

3. The method of according to claim 1, further including the step of periodically selecting at least a second additional information storage system access request for execution without regard to an associated time deadline based solely upon close proximity between an information storage system address of said second additional information storage system access request and an information storage system address of said at least one additional information storage system access request or an information storage system address of said selected one or more of said plurality of information storage system access requests in response to a determination that said associated time deadline can be met.

* * * * *